(12) United States Patent
Battaglia

(10) Patent No.: US 9,223,189 B2
(45) Date of Patent: Dec. 29, 2015

(54) SUPPORT HEAD FOR VIDEO-PHOTOGRAPHIC EQUIPMENT

(71) Applicant: LINO MANFROTTO + CO. S.p.A., Cassola (IT)

(72) Inventor: Federico Battaglia, San Giuseppe di Cassola (IT)

(73) Assignee: LINO MANFROTTO + CO. S.P.A., Cassola (VI) (IT)

( * ) Notice: Subject to any disclaimer, the term of this patent is extended or adjusted under 35 U.S.C. 154(b) by 0 days.

(21) Appl. No.: 14/385,159

(22) PCT Filed: Mar. 14, 2013

(86) PCT No.: PCT/EP2013/055229
§ 371 (c)(1),
(2) Date: Sep. 14, 2014

(87) PCT Pub. No.: WO2013/135810
PCT Pub. Date: Sep. 19, 2013

(65) Prior Publication Data
US 2015/0053831 A1   Feb. 26, 2015

(30) Foreign Application Priority Data

Mar. 14, 2012   (IT) .............................. PD2012A0080

(51) Int. Cl.
*F16M 11/14*   (2006.01)
*G03B 17/56*   (2006.01)
(Continued)

(52) U.S. Cl.
CPC .............. *G03B 17/561* (2013.01); *F16M 9/00* (2013.01); *F16M 11/04* (2013.01); *F16M 11/043* (2013.01);
(Continued)

(58) Field of Classification Search
CPC ...... G03B 17/561; G03B 17/56; F16M 11/02; F16M 11/2014; F16M 11/2021; F16M 9/00; F16M 11/105; F16M 2200/022; F16M 11/04; F16M 11/043; F16M 11/12
See application file for complete search history.

(56) References Cited

U.S. PATENT DOCUMENTS 5,839,704 A * 11/1998 Appleman ................. 248/178.1
6,729,778 B1   5/2004 Wu et al.
(Continued)

FOREIGN PATENT DOCUMENTS

DE         2306429 A1   8/1974
WO     2011056498 A2   5/2011

OTHER PUBLICATIONS

ISR and Written Opinion in PCT/EP2013/055229.
(Continued)

*Primary Examiner* — Amy Sterling
(74) *Attorney, Agent, or Firm* — Kristina Castellano; Castellano PLLC

(57) ABSTRACT

A support head (1) for video-photographic equipment comprising a base (2), a first body (5) rotating with respect to the base so as to oscillate about a first axis of rotation (X) of the head, and a first lever (10) extending from the first body along a longitudinal axis (A) and comprising a first end (12a) housed in a seat (13) obtained in the first body and a second end (12b) spaced from the first body. The first lever (10) may oscillate with respect to the first body about an axis of oscillation (P), passing through the first end (12a) and incident with the longitudinal axis (A), between an operating position in which the first lever is designed to control the oscillation of the first body about the first axis of rotation and a non-operating position of minimum encumbrance of the support head.

9 Claims, 3 Drawing Sheets

(51) Int. Cl.
*F16M 11/20* (2006.01)
*F16M 9/00* (2006.01)
*F16M 11/10* (2006.01)
*F16M 11/04* (2006.01)
*F16M 11/12* (2006.01)
*F16M 11/02* (2006.01)

(52) U.S. Cl.
CPC ............. *F16M 11/105* (2013.01); *F16M 11/12* (2013.01); *F16M 11/2014* (2013.01); *F16M 11/2021* (2013.01); *F16M 11/02* (2013.01); *F16M 2200/022* (2013.01); *G03B 17/56* (2013.01)

(56) References Cited

U.S. PATENT DOCUMENTS 6,820,844 B2 * 11/2004 Tiffen et al. .................. 248/168
7,828,256 B2 * 11/2010 Speggiorin ................. 248/187.1
8,418,973 B2 * 4/2013 Liu et al. ..................... 248/183.2

OTHER PUBLICATIONS

International Preliminary Report on Patentability in PCT/EP2013/055229.

* cited by examiner

SUPPORT HEAD FOR VIDEO-PHOTOGRAPHIC EQUIPMENT

CROSS REFERENCE TO RELATED APPLICATIONS

This application is a U.S. National Stage Application of PCT/EP2013/055229 filed on Mar. 14, 2013, which claims priority to Italian patent application PD2012A000080 filed on Mar. 14, 2012, the contents of both of which are incorporated herein by reference.

TECHNICAL FIELD

The present invention relates to a support head for video-photographic equipment having the features set out in the preamble of the main claim.

TECHNOLOGICAL BACKGROUND

A support head is a widely used accessory in the video-photographic sector and makes it possible to rotate video-photographic equipment mounted on it about one or a plurality of axes of rotation.

The support head generally comprises a base, possibly provided with means for connection to a support structure such as a tripod or the like, one or a plurality of bodies mounted in succession on one another from the base so as to enable their reciprocal rotation about respective axes of rotation and a connection plate secured to the last of these bodies to which the video-photographic equipment may be coupled in a removable manner.

The above-mentioned axes of rotation are normally perpendicular to one another and define, when the base is supported in a horizontal plane, a vertical axis passing through the base (known as the panoramic axis), a horizontal axis parallel to the optical axis of the video-photographic equipment (known as the level axis) and a horizontal axis perpendicular to the optical axis (known as the tilt axis).

The rotation of the individual bodies about their axis of rotation is preferably controlled by the operator by means of appropriate levers extending from the bodies, which often extend in perpendicular directions with respect to one another.

While this configuration undoubtedly makes it possible to manage conveniently the operations to position the video-photographic equipment, its excessive encumbrance entails that operations to transport and store the support head are complicated.

German Patent Specification DE 2306429 discloses a support head provided with a lever for moving the head about its main axis which may be tilted into a position folded close to the head. This lever does not make it possible, however, to lock the rotation of the head about its axis with the result that separate provision therefore has to be made.

WO 2011/056498 discloses a support head in which one of the control levers may be folded so as to reduce the overall encumbrance of the head when it is not being used.

The lever disclosed in that document is in particular provided with an articulated joint in a median position of its stem so as to enable the two stem portions separated by the articulated joint to move between an operating position in which said portions extend in reciprocal alignment and a non-operating position in which the portion remoter from the body of the head may be folded downwards.

This solution nevertheless has certain drawbacks, including the fact that its structure does not make it possible automatically to recover any play between the components of the articulated joint, giving rise to the possibility of unwanted oscillations between the two portions of the stem even when the articulated joint is closed in the operating position.

A further drawback lies in the fact that the embodiment of the articulated joint involves the provision and assembly of various additional components, thereby increasing the overall costs of the support head.

A further drawback lies in the fact that the presence of the articulated joint in a visible position of the stem may not be very pleasing aesthetically and detrimental to the overall aesthetic appearance of the support head.

There is therefore a need to provide solutions which make it possible effectively to reduce the encumbrance of the levers in a support head without adversely affecting the structural and functional features of current levers.

DISCLOSURE OF THE INVENTION

The problem at the basis of the present invention therefore is providing a support head for video-photographic equipment which remedies the above-mentioned drawbacks of the cited prior art.

With respect to this problem, an object of the invention is to provide a support head which is reliable, simple to manufacture and of low cost.

This problem is resolved and this object is achieved by the invention by means of a support head obtained in accordance with the appended claims.

BRIEF DESCRIPTION OF THE DRAWINGS

The features and advantages of the present invention will become clear from the following detailed description of a preferred embodiment thereof, given with reference to the appended drawings which are provided purely by way of non-limiting example, and in which.

PREFERRED EMBODIMENT OF THE INVENTION

Figure 1:
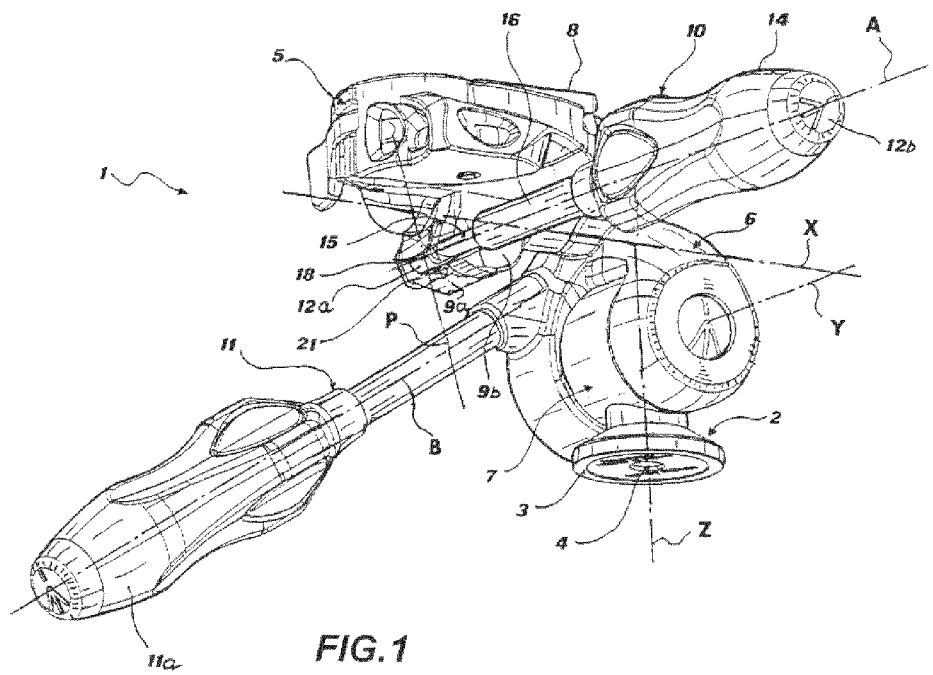
FIG. 1 is a view in lateral perspective from the bottom of a support head for video-photographic equipment of the present invention, in the operating position.

With reference to the appended drawings, a support head for video-photographic equipment (not shown in the appended drawings) realized in accordance with the present invention is indicated overall by 1.

The support head 1 comprises a base 2 on which a substantially planar support surface 3 is defined and at the location of which connection means are provided, including, for instance, a threaded hole 4, so that the support head 1 may be coupled to an external support structure of the type of a tripod or the like (not shown in the appended drawings).

The support head 1 further comprises a first body 5, a second body 6 and a third body 7 engaged in reciprocal connection with one another so as to enable them to rotate about a first axis X, a second axis Y and a third axis Z of the head 1, respectively.

In further detail, the first body 5, on which a connection plate 8 for the video-photographic equipment is provided, is coupled in a rotary manner on a pin 6a of the second body 6 extending to define the first axis X. The latter extends so as to be substantially parallel to the optical axis of the video-photographic equipment whose positioning on the connection plate 8 is predetermined, so as to form the level axis of the head 1. The connection plate 8 is preferably detachable from the first body 5, in accordance with features and methods known per se in the art, and is provided with a threaded pin 8a able to engage the video-photographic equipment.

The first body 5 further comprises a first and a second braking member 9a, 9b, which embrace the pin 6a on opposite sides and may be moved together in order to stop the first body 5 from oscillating about the first axis of rotation X.

Similarly, the second body 6 is coupled in a rotary manner with the third body 7 so as to rotate about the second axis Y, disposed so as to be substantially perpendicular to the first axis X, but parallel to the surface 3 of the base 2, thus forming the tilt axis of the head 1.

The third body 7 is in turn coupled in a rotary manner with the base 2 so as to rotate about the third axis Z, which extends in a perpendicular manner with respect both to the first and second axes X and Y and the surface 3, thus forming the panoramic axis of the support head 1.

In order to cause the bodies 5 and 6 to rotate about their respective axes of rotation, the support head 1 comprises a first lever 10, extending from the first body 5 along a longitudinal axis A and a second lever 11 extending from the second body 6 along a longitudinal axis B.

FIG. 1 shows the support head 1 in a standard operating position, with the surface 3 of the base 2 and the connection plate 8 parallel to one another. In this position, there is a rear side of the head 1 where the operator may be positioned and an opposing front side facing the visual field of the video-photographic equipment. The first body 5 is preferably displaced, with respect to the axis Z, towards the rear side of the support head 1.

In order to facilitate the operations to position the video-photographic equipment, it is advantageous if the second lever 11 also extends towards the rear side of the support head 1, preferably with a downward inclination of the longitudinal axis B so as not to interfere with the first body 5. In this position, the first lever 10 extends laterally, for instance towards the right when looking at the head 1 from the position of the operator.

In this way both the first and the second lever 10, 11 may be readily gripped by the operator in order to control the rotation of the video-photographic equipment coupled to the connection plate 8 about the axes X, Y and Z.

At its free end the second lever 11 comprises a grip 11a and is secured rigidly to the second body 6 so that the operator may readily control both the rotation of the second and third body 6, 7 with respect to the base 2 about the axis Z, and the rotation of the second body 6 with respect to the third body 7 about the axis Y.

Locking means are also provided to lock the rotation of the second and third bodies 6, 7 about the axes Z and Y, which are preferably controlled by the second lever 11 in accordance with methods known per se.

The first lever 10 comprises a first end 12a housed in a seat 13 provided in the first body 5 and a longitudinally opposite second end 12b.

According to a first aspect of the present invention, the first lever 10 may oscillate with respect to the first body 5 about an axis of oscillation P, passing through its first end 12a and substantially perpendicular to the longitudinal axis A, between an operating position in which the first lever 10 is designed and in particular configured to control the oscillation of the first body 5 about the first axis of rotation X and a non-operating position of minimum encumbrance enabling the transport and storage of the support head 1.

Figure 2:
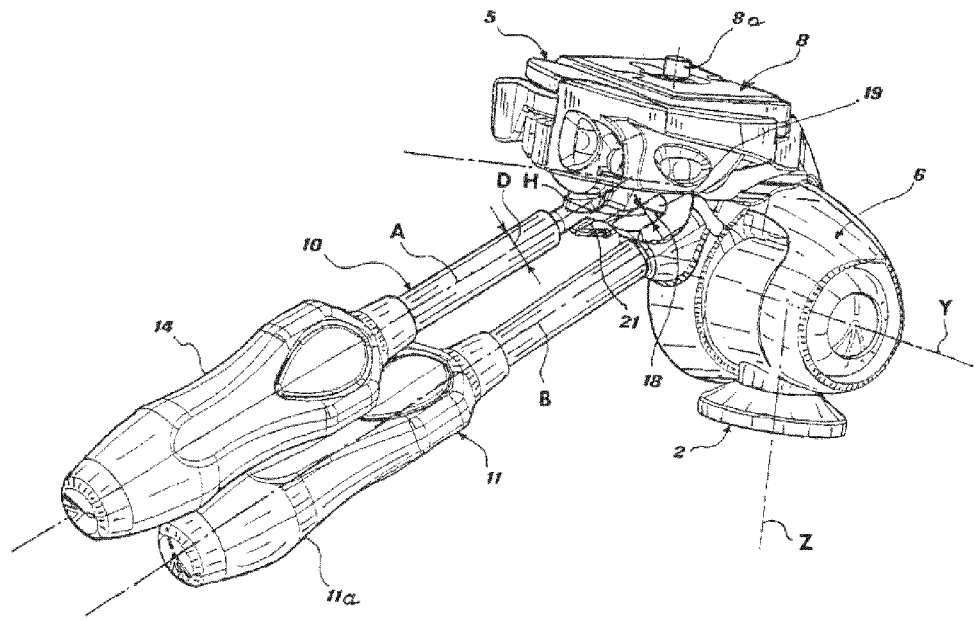
FIG. 2 is a view in lateral perspective from the top of the support head of FIG. 1, in the non-operating position.
Figure 3:
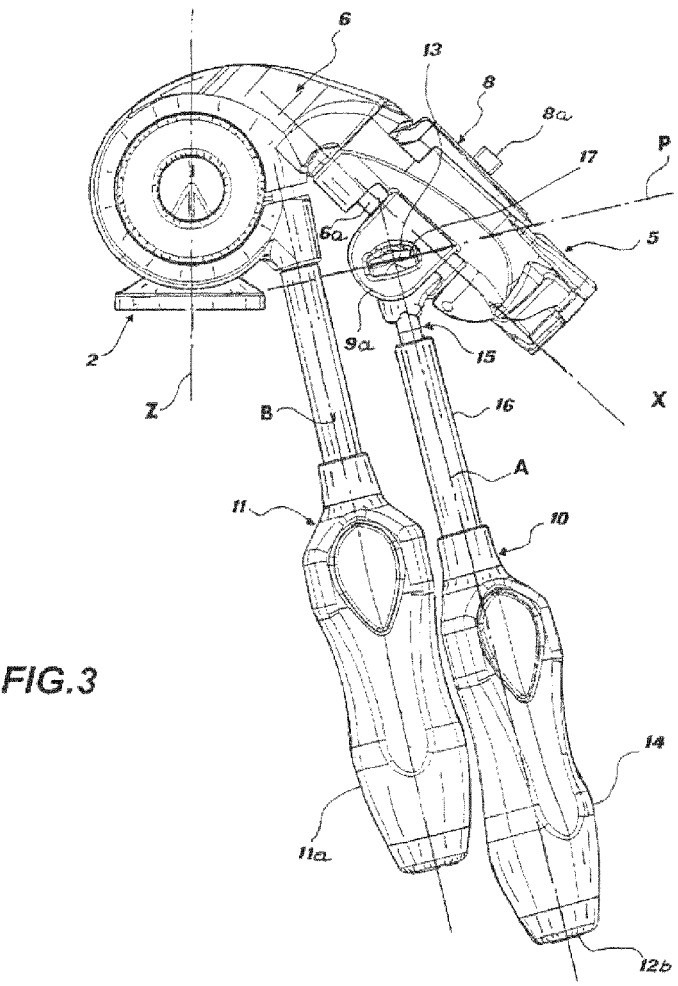
FIG. 3 is a lateral elevation of the head of FIG. 2.
Figure 4:
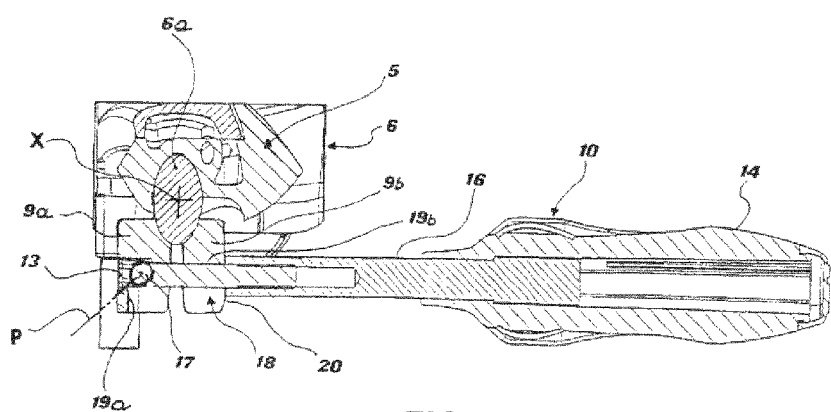
FIGS. 4 and 5 are cross-sectional views of a portion of the support head of the preceding Figures, in the operating position of FIG. 1 and the non-operating position of FIG. 2 respectively.
Figure 6:
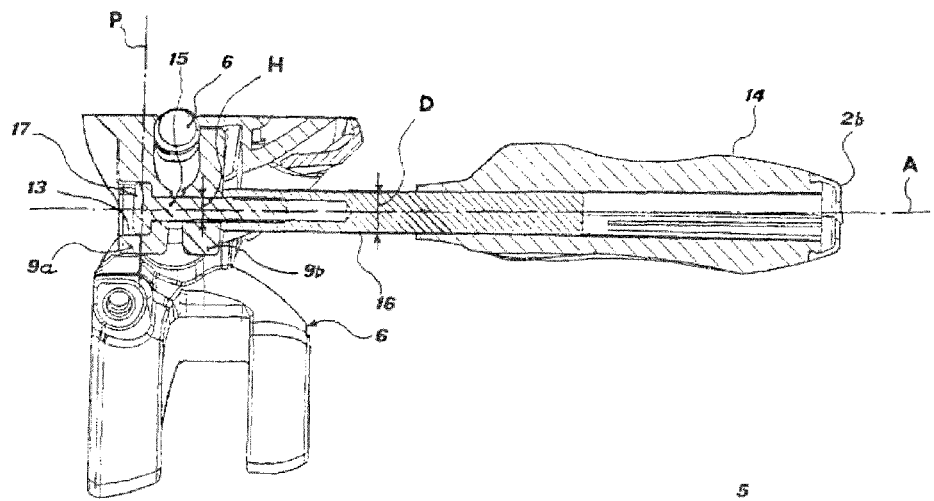
FIG. 6 is a cross-sectional view along the line VI-VI of FIG. 4.
Figure 5:
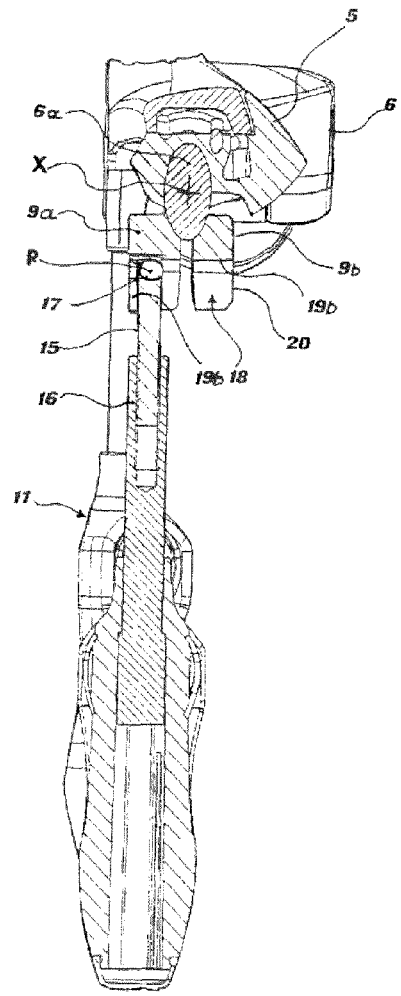

As can be seen in FIGS. 2 and 3 respectively, when oscillated into the operating position the first lever 10 extends from the first body 5 in a direction substantially perpendicular to the first axis of rotation X, laterally with respect to the head 1, while when oscillated into the non-operating position, the first lever 10 extends towards the rear side of the support head 1 and preferably extends such that its longitudinal axis A is substantially parallel to the longitudinal axis B of the second lever 11.

The first lever 10 comprises a first stem portion 15 comprising the first end 12a, and a second stem portion 16 comprising the second end 12b, which is telescopically screw-engaged with the first stem portion 15 in order to move the first and second ends 12a, 12b of the first lever 10 towards or away from one another by rotating the second stem portion 16 about the longitudinal axis A.

For this purpose, at the first end 12a, the first lever 10 comprises a head 17 which is housed in the seat 13 with a coupling such as to prevent the rotation of the first stem portion 15 about the longitudinal axis A.

The head 17 in particular extends in a direction substantially perpendicular to the longitudinal axis A, defining the axis of oscillation P about which the first lever 10 oscillates in order to move from the operating position to the non-operating position and vice versa.

To facilitate the movement of the first lever 10, a grip 14 is provided on the second stem portion 16 at the second end 12b.

In order to enable and guide the oscillating movement of the first lever 10, a slot 18, open in the seat 13, is provided in the first body 5 and extends along a plane substantially perpendicular to the axis of oscillation P. The slot 18 is bounded by two ends 19a and 19b which form the end points of the oscillating movement of the first lever 10. In particular, at the end 19a, a retaining member for the first lever 10 may be provided, formed for instance by a cross-sectional restriction 21 which prevents the first lever 10 from oscillating freely when it is displaced into the non-operating position.

The seat 13 is preferably obtained in the first braking member 9a of the first body 5 and the second braking member 9b is traversed by the slot 18. Moreover, the second stem portion 16 has a diameter D greater than the height H of the slot 18 so as to abut against the first body 5 when displaced towards the first end 12a.

When the lever 10 is in the operating position, the first stem portion 15 traverses both the first and the second braking member 9a and 9b. In this way, when the second stem portion 16 is closed up to the first end 12a, it encounters the second braking member 9b at the slot 18, while the head 17 encounters the first braking member 9a, thus causing them to move closer to one another about the pin 6a and to lock the rotation of the first body 5 about the first axis of rotation X.

The first lever 10, when displaced into the operating position, thus forms a device for locking the rotation of the first body 5 about the first axis of rotation X.

In contrast, when the first lever 10 is displaced into the non-operating position, the second braking member 9b is not traversed by the first stem portion 15, such that the clamping of the second stem portion 16 against the slot 18 does not entail the locking of the first body 5 on the pin 6a.

The first body 5 preferably has, at the end 19b of the slot 18, a profile with a first planar section 20 which is substantially perpendicular to the longitudinal axis A when the first lever 10 is displaced into the operating position.

In this way, in order to be able to oscillate from the operating position to the non-operating position, the second stem portion 16 must be moved away from the first end 12a by a distance greater than a predetermined minimum measurement. This makes it necessary to carry out a minimum number of rotations of the second stem portion 16 about the longitudinal axis A, thus preventing the first lever 10 from oscillating towards the non-operating position as soon as the second stem portion is detached from the first body 5.

This makes it possible advantageously to define, in the operating position, a first operating interval in which the operator rotates the second stem portion 16 about the axis A in order to control the locking and unlocking of the rotation of the first body 5 about the first axis of rotation X and a second operating interval, spaced by a certain number of rotations, in which the operator spaces the second stem portion 16 by a measurement sufficient to enable the first lever 10 to oscillate towards the non-operating position.

As an alternative to the planar section 20, it will be appreciated that the profile of the first body 5 may be configured in other ways, provided that the distance between the points of a section adjacent to the end 19b of the slot 18 and the head 17 is greater than the distance between the latter and the end 19b.

As a result of the features described above, the support head 1 may be transported and stored in a configuration in which the first and the second levers 10, 11 are substantially parallel to one another, thus minimizing the overall encumbrance of the head 1.

When the head 1 is to be brought into operation, the second stem portion 16 is rotated about the longitudinal axis A so as to move away from the first end 12a by an appropriate measurement, after which the first lever 10 is oscillated from the end 19a towards the end 19b, overcoming the resistance of the cross-sectional restriction which tends to retain the first lever 10 at the end 19a.

When the first lever 10 reaches the end 19b, the operating position is reached and the second stem portion 16 is rotated about the longitudinal axis A in order to abut against the first body 5 at the edge of the second braking member 9b.

The first body 5 may thus be oscillated about the first axis of rotation X by maneuvering the first lever 10 into the desired position where the oscillation is locked by further rotating the second stem portion 16 against the first body 5 causing the first and second braking members 9a and 9b to move closer to one another.

The present invention thus resolves the problem described above and at the same time achieves many other advantages, including the fact that the visible aesthetic features of the first lever are not impaired in any way. Moreover, as the solution of the present invention does not introduce any play into the lever oscillation mechanism which could interfere with the normal use of the lever in operation, it does not require components or mechanisms designed to offset or eliminate such play.

The invention claimed is:

1. A support head for video-photographic equipment comprising:
   a base comprising a pin defining a first axis of rotation (X) of said head,
   a first body coupled in a rotary manner with the base in order to rotate about the first axis of rotation (X) and comprising a first braking member and a second braking member which embrace said pin on opposite sides and may be reciprocally closed together in order to abut against said pin and lock the rotation of the first body about the base, as well as
   a first lever extending from the first body along a longitudinal axis (A) and comprising a first end housed in a seat obtained in the first body and a second end spaced from the first body, wherein the first lever may oscillate with respect to the first body about an axis of oscillation (P) passing through the first end and incident with respect to the longitudinal axis (A), between an operating position in which the first lever is arranged to cause the first body to oscillate about the first axis of rotation and a non-operating position of minimum encumbrance,
   wherein the seat for the first end of the lever is obtained in the first braking member and the second braking member is traversed by a slot guiding the oscillation of the first lever between the operating position and the non-operating position and in that the lever, when in the operating position, abuts on the second braking member in order to control the reciprocal closing together of the first and second braking members about the pin.

2. The support head according to claim 1, wherein the first lever comprises, at the first end, a head extending in a direction substantially perpendicular to the longitudinal axis (A) so as to define the axis of oscillation (P).

3. The support head according to claim 1, wherein the first lever comprises a first stem portion comprising the first end and a second stem portion telescopically engaged with respect to the first stem portion in order to move the first and second ends towards and away from one other.

4. The support head according to claim 3, wherein the first stem portion is screw-engaged in the second stem portion so that the spacing between the first end and the second stem portion can be varied by rotating the second stem portion about the longitudinal axis (A).

5. The support head according to claim 3, wherein the coupling between the first stem portion and the first body is such as to prevent this first stem portion from rotating about the longitudinal axis (A).

6. The support head according to claim 3, wherein the lever, when in the operating position, abuts against the second braking member in order to control the reciprocal closing together of the first and second braking members about the pin, at the location of the second stem portion.

7. The support head according to claim 3, wherein the second stem portion has a diameter (D) greater than the height (H) of the slot so as to abut against the second braking member when abutting against the first body at the location of the slot.

8. The support head according to claim 3, wherein the first body has a profile with a first substantially planar section perpendicular to the longitudinal axis (A) of the first lever when the first lever is in the operating position, such that the second stem portion has to be spaced from the first end by a distance greater than a predetermined minimum measurement in order to be able to oscillate from the operating position to the non-operating position.

9. The support head according to claim 1, wherein a second body interposed between the base and the first body is provided, this second body being able to oscillate both with respect to the base about a second axis of rotation (Y) of the support head, and with respect to the first body about the first axis of rotation (X), this second body being provided with a second lever in order to control the rotation of the second body about the second axis of rotation, the first lever being substantially parallel to the second lever when it is displaced into the non-operating position.

* * * * *